United States Patent Office 3,179,312
Patented Apr. 20, 1965

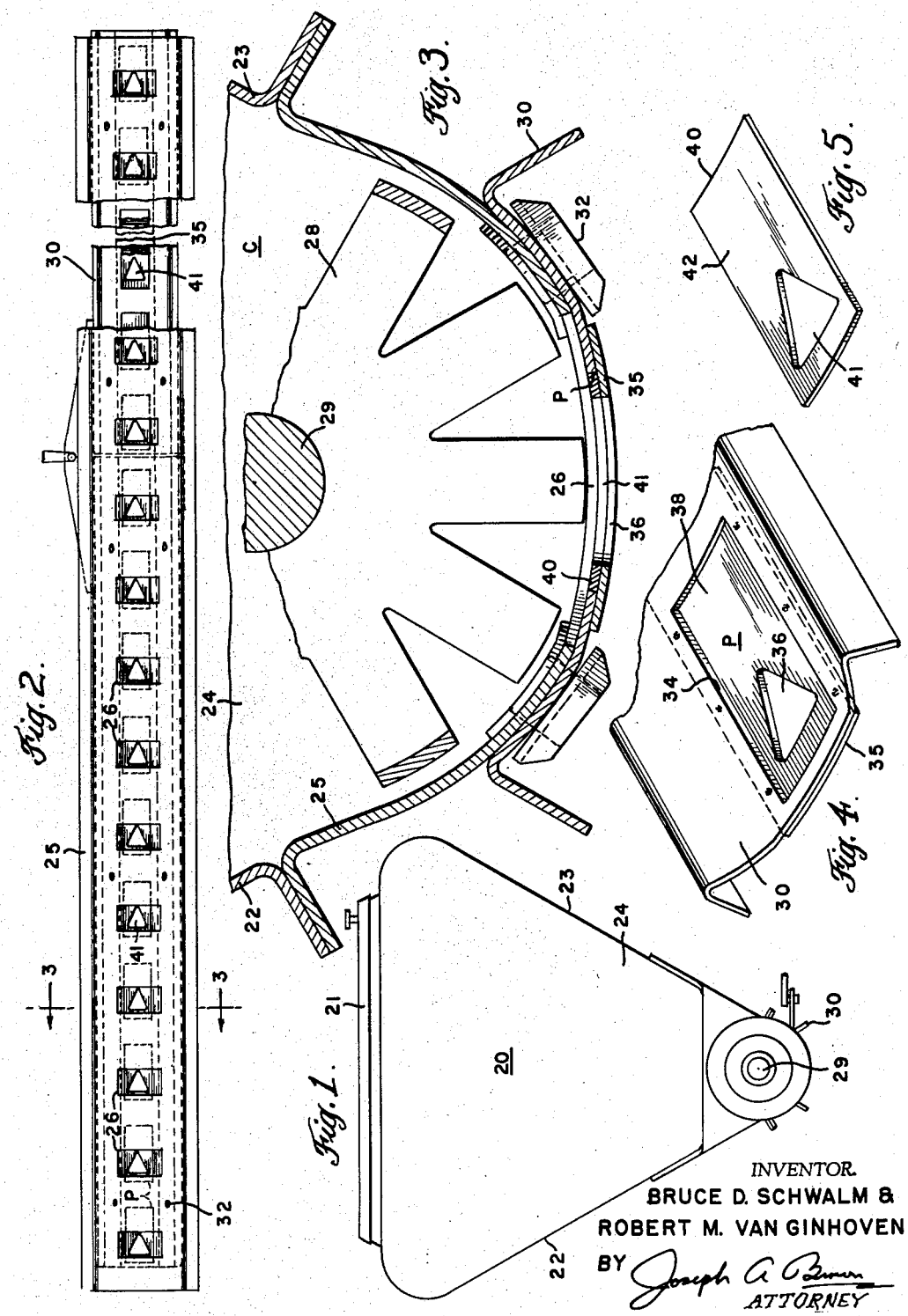

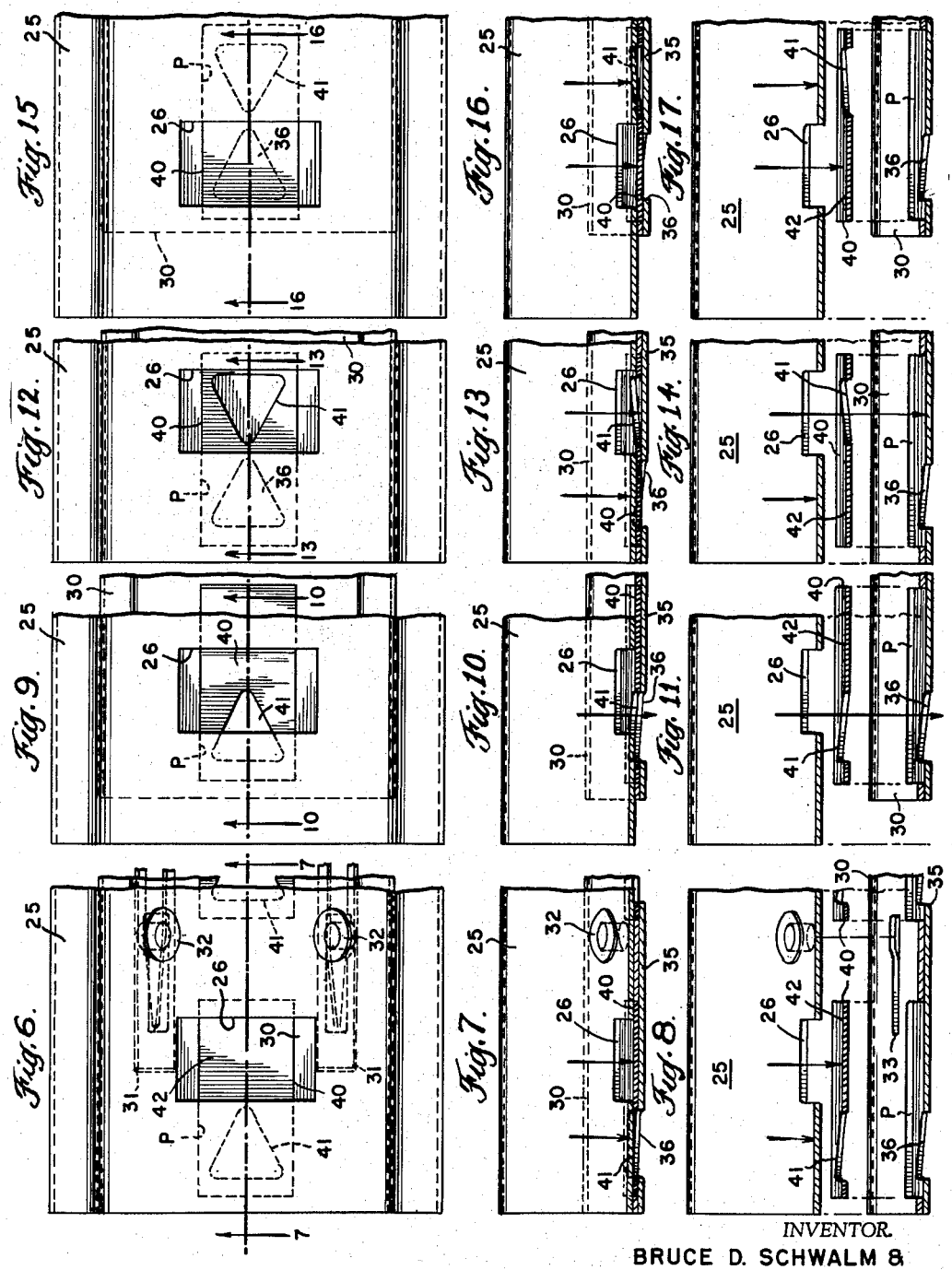

3,179,312
FERTILIZER DISTRIBUTOR OUTLET CONTROL
Bruce D. Schwalm, Leola, and Robert M. Van Ginhoven,
Bareville, Pa., assignors to Sperry Rand Corporation,
New Holland, Pa., a corporation of Delaware
Filed Dec. 2, 1963, Ser. No. 327,402
11 Claims. (Cl. 222—486)

This invention relates to apparatus for dispensing dry, fluent materials and more particularly to a fertilizer distributor.

A conventional distributor for granular fertilizer includes a wheel supported frame adapted to be drawn over a field by a tractor. An elongated hopper is carried on the frame and extending transversely of the direction of travel. The hopper has a series of uniformly spaced bottom outlets through which the fertilizer flows to the ground. An agitator is provided in the hopper bottom and rotated by a connection to the ground wheels. A slidable shutter is provided to open and close the hopper outlets and vary the flow rate. In this way, the quantity of material distributed per acre may be controlled.

On some occasions, the operator wishes to have all of the hopper outlets opened so that broadcast spreading will result and a substantially continuous lateral band of fertilizer will be deposited. On other occasions, the operator may wish to close certain outlets in the hopper so that the fertilizer will be deposited in bands or spaced rows. This procedure is used where row crops are to be grown and it is desired to deposit the fertilizer only along the rows. Most fertilizer distributors presently available, and of the type described, are not adapted for broadcast and row crop use. They are adapted for one use or the other, but not selective use related to both methods.

Certain attempts have been made to provide distributors which can be selectively used to broadcast spread or deposit material in spaced rows. For example, it is known to provide individual cover members for shutter openings and adapted to be bolted or otherwise fastened in place. Selected openings can be left open and others closed. This procedure achieves the desired objective. However, the structure is expensive because of the substantial number of fixed and movable fastening elements required, and under the corrosive action of the fertilizer the fasteners become difficult to remove and install. Further, regardless of easy or difficult mounting or removal of cover members, the time involved in handling them is very substantial and requires the use of special tools.

A main object of this invention is to provide a fertilizer distributor having a unique shutter construction whereby the distributor can be used selectively for broadcast or band spreading.

Another object of this invention is to provide a fertilizer distributor which can be set to operate for broadcast or band spreading without involving the use of special tools.

Another object of this invention is to provide a fertilizer distributor in which discharge control elements for hopper outlets are held in place by the pressure of fertilizer in the distributor hopper, no fastening members whatever being employed to hold the control elements in place.

A further object of this invention is to provide a fertilizer distributor of the character described wherein the spreading of material can be changed over from broadcast to band spreading with minor effort and very little time.

A further object of this invention is to provide a fertilizer distributor of the character described wherein a shutter is so constructed that the corrosive action of the fertilizer has minimal effect upon the operation of the spreader and the availability of change over from broadcast to band spreading.

A still further object of this invention is to provide a fertilizer distributor of the character described which is of low cost design and achieves the foregoing advantages without altering the basic distributor hopper.

Other objects of this invention will be apparent hereinafter from the specification and from the recital in the appended claims.

In the drawings:

FIG. 1 is an end view of a fertilizer distributor constructed according to this invention;

FIG. 2 is a plan view of the distributor bottom and the associated shutter and metering plates. In this view the distributor shutter is shown shifted to its extreme right position and with the discharge control meter plates positioned so that all hopper outlets are opened and broadcast spreading will be provided;

FIG. 3 is an enlarged vertical section taken on the line 3—3 of FIG. 2 looking in the direction of the arrows;

FIG. 4 is a fragmentary perspective view, on a scale smaller than FIG. 3, of one end of the distributor shutter and showing one of the pockets formed therein;

FIG. 5 is a perspective view showing one of the meter plates used with the shutter and adapted to be inserted in one of the shutter pockets;

FIGS. 6, 9, 12 and 15 are fragmentary, enlarged, plan views showing the hopper bottom and shutter structure in various positions of adjustment;

FIGS. 7, 10, 13 and 16 are medial vertical sections of FIGS. 6, 9, 12 and 15, respectively, taken on the lines indicated and looking in the directions of the arrows; and FIGS. 8, 11, 14 and 17 are exploded views of FIGS. 7, 10, 13 and 16, respectively.

Referring now to the drawings by numerals of reference, and particularly to FIGS. 1–3, 20 denotes a hopper adapted to receive a supply of fertilizer to be distributed. Hopper 20 is provided with a top cover 21 which may be opened so that material may be dumped into hopper compartment C. The hopper has longitudinal side walls 22 and 23 and end walls 24. The side walls are inclined downwardly and toward each other and the hopper is formed with a generally U-shaped trough like bottom 25.

Hopper 20 is elongated and extends transversely of the direction in which it is adapted to travel. Bottom 25 is provided with a series of rectangularly shaped outlets 26, as shown, uniformly spaced relative to each other. Above bottom 25 an agitator 28 is provided and rotatable on shaft 29 supported on end walls 24. When the agitator is rotated, fertilizer material in hopper 20 flows through outlets 26 for deposit on the ground. The agitator insures a continuous flow of material and prevents bridging. The spacing between the outlets 26 is such that if all of the outlets are opened, a substantially continuous transverse band of material is broadcast and spread on the ground.

For controlling the rate of discharge of fertilizer from hopper 20, a shutter 30 is provided which slidably engages the underside of the bottom 25. Shutter 30 is curved to conform to the configuration of the bottom 25 and it is slidably connected to the bottom by means of hair pin cotters 31, shown best in FIG. 6, which engage studs 32 secured to the hopper bottom and projecting through slots 33 (FIG. 8) in the shutter. The hair pin cotters and studs are located in pairs at spaced locations along the hopper. For slidably adjusting the shutter relative to the hopper, means not shown is provided constructed as disclosed in U.S. Patent No. 2,902,185. The shutter is adjustable from the fully opened position of FIG. 2 to the fully closed position of FIG. 6 and to any intermediate position.

Shutter 30 is provided with cutouts 34 which are rectangularly shaped as shown best in FIG. 4 and elongated in the direction of extension of the shutter. Tack welded to the bottom of the shutter to close off each cutout is a bottom strip 35. Each cutout 34 and bottom strip 35 forms a pocket P in shutter 30 and a triangularly shaped opening 36 is provided at one end of the pocket. The opposite end of the pocket is closed by portion 38 of strip 35. There is one cutout 34 for each hopper opening 26 and in register therewith regardless of the position of adjustment of shutter 30. The opening 36 in each pocket P matches with one of the outlets 26 in hopper 20 when the shutter is in the right hand position of adjustment as shown in FIG. 2. Fertilizer may then travel downwardly through outlets 26 and then through opening 36 to the ground.

For selectively closing various openings 36 in shutter 30, discharge control elements in the form of meter plates 40 (FIG. 5) are provided for the pockets P. There is one meter plate for each pocket. Each plate has a triangular opening 41 the same size as the openings 36 in the shutter pockets P. Each meter plate 40 may be mounted in a first position in its associated pocket P and with the openings 41 and 36 in register. Each plate may also be mounted in a second position, one hundred and eighty degrees from the first, and with the opening 41 in register with portion 38 of the associated pocket P and out of register with opening 36. Thus, in one position of each meter plate, its associated pocket opening 36 is opened and in a second position the opening is closed.

With all of the meter plates 40 disposed in the pockets P with the openings 41 in register with the openings 36, shutter 30 operates as shown in FIGS. 6-11 and FIG. 2. With the shutter 30 adjusted to the left as shown in FIG. 6, the registering openings 41 and 36 are spaced to the left of hopper outlets 16. When so located, all of the hopper outlets are closed and material may not be dispensed. When shutter 30 is adjusted from the left and toward the right from the position shown in FIG. 6, to the position shown in FIG. 9 and toward the position of FIG. 2, the registering openings 41 and 36 gradually come into register with the associated outlets 26 in hopper bottom 25. When a register takes place, material flows downwardly for discharge from hopper 20. The amount of register of the triangular openings 41 and 36 with the outlets 26 determines the rate of flow of material from the hopper.

If the operator of the machines wishes to close off any of the openings in hopper 20 to achieve band spreading of material, he merely detaches shutter 30 from the bottom 25 of the hopper and reverses those meter plates 40 where he wants to close off and prevent the discharge material. When the desired meter plates have been repositioned one hundred and eighty degrees from their former locations, the openings 36 and 41 will no longer be in register, as shown best in FIGS. 12-17. Each outlet 26 is in register with the opening 41 in the meter plate 40 beneath it. However, material may not be discharged because the material is prevented from escaping by the portion 38 of the bottom strip 35 in the associated pocket P. When the shutter is then adjusted from the position shown in FIG. 12 and toward the right to the position in FIG. 15, the adjacent opening 36 moves into register with its outlet 26. However, the portion 38 of the meter plate now closes off its outlet 26 and prevents the discharge of material.

Therefore, material will be dispensed through any given outlet 26 in the hopper only if the metering plate 40 associated with such outlet is mounted with the opening 41 in register with the opening 36. If the meter plate is disposed in its associated pocket with the opening 41 out of register with the opening 36, then adjustment of the shutter will not open the associated hopper outlet 26. Any hopper outlet 26 may be closed off if desired. Of the series of outlets, one may be opened and then three closed and then one opened and three closed, across the length of the distributor, or any other combination of opened and closed outlets may be provided.

With this structure, no fastening members are employed and no special tools are needed to install meter plates 40 and hold them in place. Each meter plate seats freely in its pocket P, between the shutter and the hopper bottom and it is pressed downwardly by the pressure of material in hopper 20 and having access to the plates through outlets 26. Another feature of applicants' design is that the length of each pocket P is such relative to the amount of possible adjustment of shutter 30 and the size of outlets 26 that each meter plate 40 always extends beyond the edges of the associated hopper outlet. As shown in FIG. 6, the right end of the plate 40 extends beyond the right edge of outlet 26. Also, when the shutter is adjusted to its far right position, FIG. 15, the left end of the meter plate extends beyond the left edge of each outlet 26. This eliminates any possibility of the edges of the meter plate becoming caught onto the edges of its outlet 26. Free sliding movement of the shutter and the meter plates is thus assured.

The corrosive action of the fertilizer will not adversely affect the shutter and the meter plates. The meter plates are easily removed and quickly reversed. The overall design is simple and low cost and the hopper construction is not altered to achieve the desired results. The plates 40 may be formed from the blanked pieces which result when the cutouts 34 are formed. The construction is inexpensive to manufacture, simple to assemble and easy to use. The machine can be selectively employed either for broadcast spreading of fertilizer or band spreading if desired. Further the particular spacing of the bands which are to be deposited can be varied at will.

While this invention has been described in connection with a particular embodiment thereof, it will be understood that it is capable of modification, and this application is intended to cover any variations, uses, or adaptations following, in general, the principles of the invention and including such departures from the present disclosure as come within known or customary practice in the art to which the invention pertains, and as fall within the scope of the invention or the limits of the appended claims.

Having thus described our invention, what we claim is:

1. A fertilizer distributor comprising a hopper having a plurality of spaced discharge outlets in the bottom thereof, a shutter slidably mounted on the underside of said hopper and having openings adapted to be moved in and out of register with the hopper outlets to regulate the flow of material from the hopper, an elongated pocket in said shutter at each opening, each pocket being opened upwardly toward said hopper underside and its associated opening being located in the pocket adjacent one end thereof, and an elongated meter plate insertable downwardly in each pocket to seat therein, each plate having an opening adjacent one end which registers with the opening in its associated pocket when the plate is in one position and is out of register with the pocket opening when the plate is in a second position, whereby selected openings in said shutter may be closed to prevent the discharge of material from related outlets in said hopper.

2. A fertilizer distributor as recited in claim 1 wherein said shutter is slidable to a given location in one direction to open said outlets and to a given location in an opposite direction to close said outlets, each closure plate extending beyond opposite sides of its associated outlet along the direction of movement of said shutter regardless of the location of the shutter.

3. A fertilizer distributor as recited in claim 1 wherein the length of each meter plate is substantially the same as the length of the pocket in which it seats and each plate being retained in its associated pocket by the downward pressure of fertilizer in said hopper and through said outlets.

4. A fertilizer distributor as recited in claim 1 wherein said hopper outlets are rectangularly shaped, the openings in said shutter pockets and meter plates are triangular, and all openings being of the same size.

5. A fertilizer distributor as recited in claim 1 wherein each pocket is elongated in the direction of movement of said shutter and when each meter plate is in said second position, it is one hundred and eighty degrees from said one position.

6. A fertilizer distributor comprising a hopper having a plurality of spaced discharge outlets in the bottom thereof, a shutter mounted on the underside of said hopper for slidable movement relative thereto and within a limited range, a pocket in said shutter for each of said hopper outlets, each pocket being opened upwardly in register with one of the outlets of said hopper regardless of the position of said shutter, each of said pockets having an opening adapted on sliding of said shutter to be moved in and out of register with an associated hopper outlet to regulate the flow of fertilizer from the hopper, and a meter plate insertable in each pocket to seat therein and close its associated opening, each meter plate beting retained in its associated pocket by the downward pressure of fertilizer in said hopper and through the associated outlet.

7. A fertilizer distributor comprising a hopper formed with an elongated trough like bottom having a plurality of spaced discharge outlets, a shutter mounted on the underside of said hopper for sliding movement in the direction of extension of the hopper bottom, said shutter having a cut-out in register with each hopper outlet, a bottom strip on the underside of said shutter and closing each cut-out except for an opening adjacent one end of each cut-out, said bottom strip and each cut-out forming a pocket opened upwardly, a meter plate seated in each pocket, each plate having an opening adjacent one end which registers with the opening in its associated cut-out when the plate is in one position and is out of register with the opening when the plate is in a second position, whereby selected openings in said shutter may be closed to prevent discharge of material from related outlets in said hopper, the size of each plate being substantially the same as the size of each cut-out and each plate being confined between each bottom strip and the hopper bottom and slidable with said shutter.

8. A fertilizer distributor as recited in claim 7 wherein each meter plate is formed from the piece resulting when each cut-out is formed in said shutter, and each plate being held in its associated pocket by the downward pressure of material in said hopper.

9. A fertilizer distributor comprising a hopper having a plurality of spaced discharge openings in the bottom thereof, a shutter slidably mounted on the underside of said hopper and having openings adapted to be moved in and out of register with the hopper openings to regulate the flow of material from the hopper, and means for closing selected shutter openings whereby material may be discharged through certain hopper openings and not through others, said closing means comprising a pocket in said shutter surrounding each shutter opening, and a two position meter plate seated in each pocket, each plate having an opening which registers with its associated shutter opening when the plate is in one position and is out of register therewith when the plate is in the other position.

10. A fertilizer distributor comprising a hopper having a plurality of spaced discharge outlets in the bottom thereof, a shutter slidably mounted on the underside of said hopper and having openings adapted to be moved in and out of register with the hopper outlets to regulate the flow of material from the hopper, said shutter having a pocket surrounding each opening and opened upwardly toward said hopper underside, and a plate insertable in each pocket to seat therein and close its associated shutter opening, whereby selected openings in said shutter may be closed and the discharge of material from related outlets in said hopper may be prevented.

11. A fertilizer distributor comprising a hopper having a plurality of spaced discharge outlets in the bottom thereof, a shutter slidably mounted on the underside of said hopper and having openings adapted to be moved in and out of register with the hopper oulets to regulate the flow of material from the hopper, a meter plate for each shutter opening insertable betwen the shutter and the hopper to close off the opening.

References Cited by the Examiner
UNITED STATES PATENTS

| 745,903 | 12/03 | Ploss | 222—289 |
| 2,710,120 | 6/55 | Thomsen | 222—486 |
| 2,916,189 | 12/59 | Christenson | 222—561 X |

LOUIS J. DEMBO, *Primary Examiner.*
EVERETT W. KIRBY, *Examiner.*